Nov. 18, 1958 — G. H. HOWLETT — 2,860,522
SHIFTING MECHANISM FOR TRANSMISSION
Filed July 10, 1956 — 3 Sheets-Sheet 1
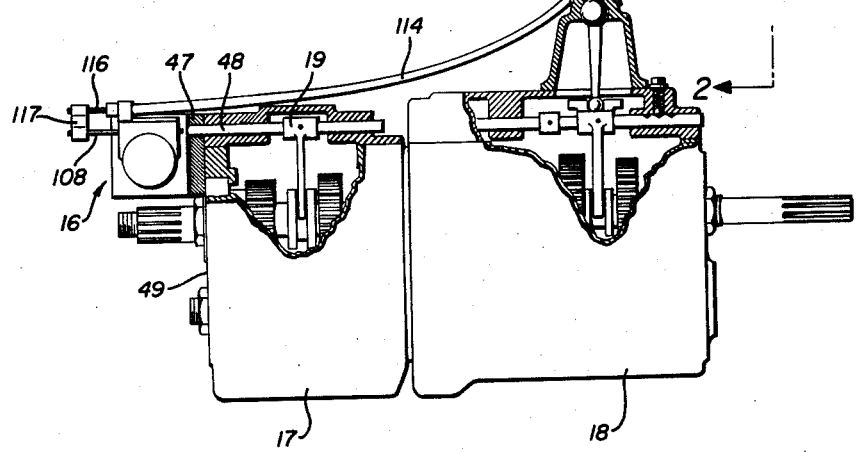
Fig. 1
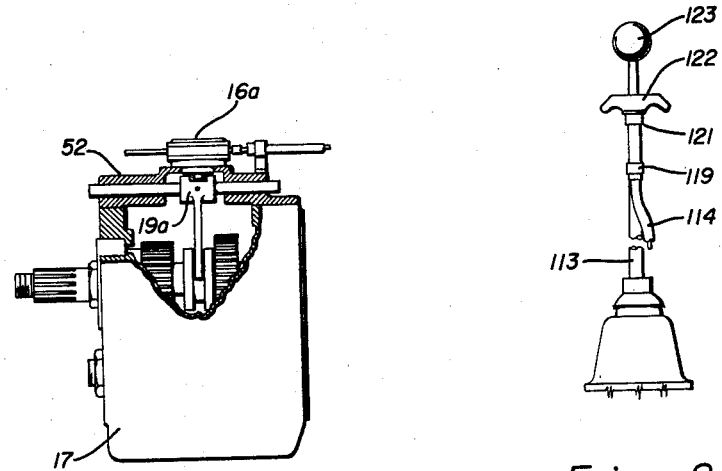
Fig. 3
Fig. 2
INVENTOR.
George H. Howlett
Attorney INVENTOR.
George H. Howlett
His Attorney Nov. 18, 1958 G. H. HOWLETT 2,860,522
SHIFTING MECHANISM FOR TRANSMISSION
Filed July 10, 1956 3 Sheets-Sheet 3
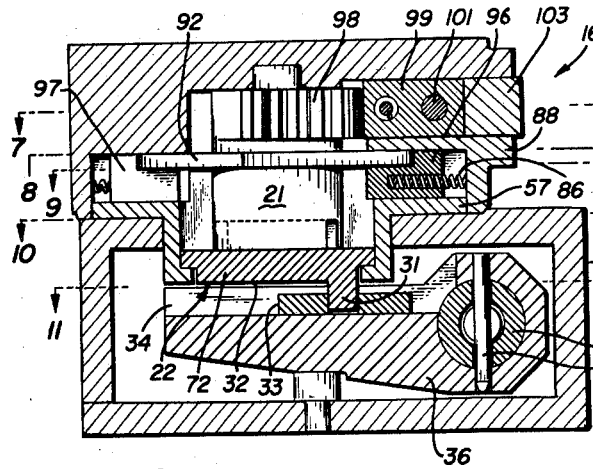
Fig. 6
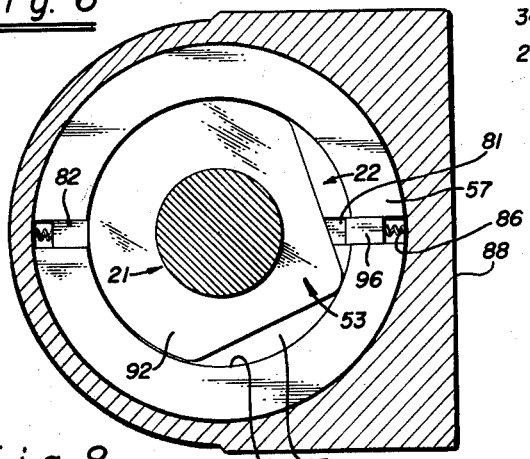
Fig. 8
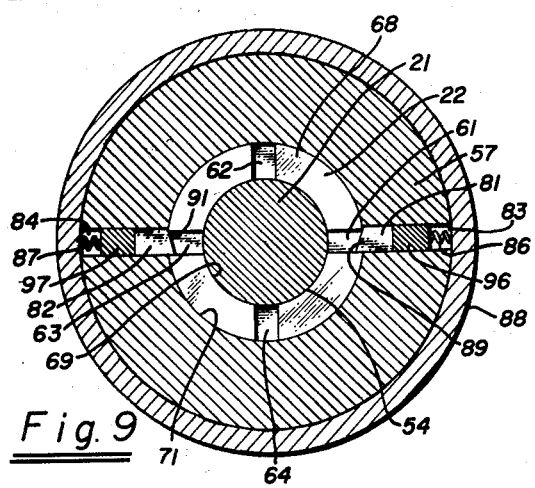
Fig. 9
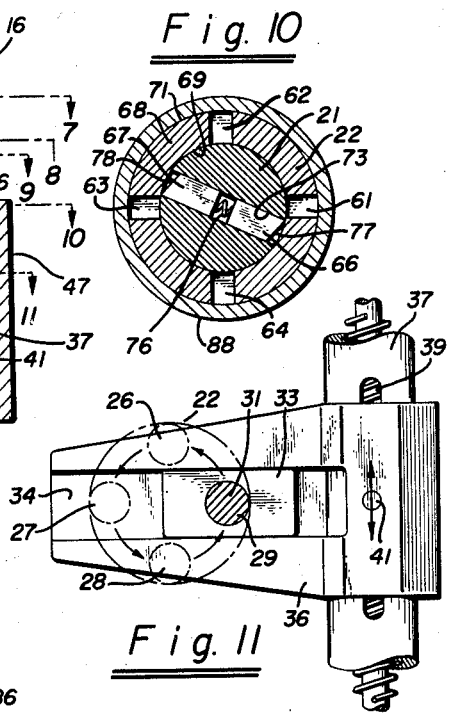
Fig. 10
Fig. 11
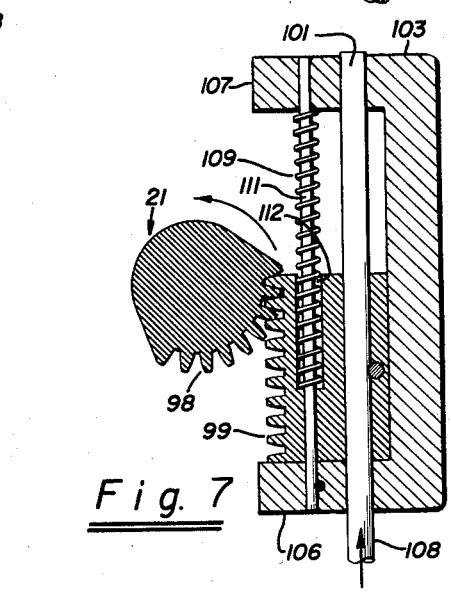
Fig. 7
INVENTOR.
George H. Howlett
BY
*His* Attorney

United States Patent Office 2,860,522
Patented Nov. 18, 1958

2,860,522

SHIFTING MECHANISM FOR TRANSMISSION

George H. Howlett, Oakland, Calif., assignor to Frank H. Howlett, Oakland, Calif.

Application July 10, 1956, Serial No. 597,030

8 Claims. (Cl. 74—473)

The invention relates to automotive transmissions and, more particularly, to arrangements using a main multi-speed transmission and an auxiliary, or secondary, transmission each having a shift or gear selector means so as to provide a multiplication of transmission speeds enabling the driver to select the gear ratio to suit various road, grade and load conditions for most efficient operation and optimum performance.

An object of the present invention is to provide a shifting mechanism of the character described which will enable the operator to take advantage of the available gear ratios and to effect sequential shifting into the various combinations of gears rapidly, precisely and positively with minimum loss or change in road speed and with maximum protection to the gear trains.

Another object of the present invention is to provide a shifting mechanism of the character above which is adapted for mounting directly on the auxiliary transmission to be shifted with a remote control mountable on the shift lever for the main transmission, and so arranged as to afford one-hand shifting operation for both transmissions without removing the hand from the shift lever, the remote control providing in particular a simple unidirectional forward and return stroke effecting on successive forward strokes the shifting of the auxiliary transmission to alternately in-gear and out-of-gear neutral positions, thus providing a rapid, automatic and positive finding or selection of neutral position required to expedite double clutching and other shifting of the main and auxiliary transmissions, and wherein on each alternately successive forward stroke the auxiliary transmission will be rapidly, automatically and precisely shifted to, and positively locked in, the driving or in-gear position.

A further object of the present invention is to provide a shifting mechanism of the character described which is constructed of a minimum number of sturdily formed parts adapted for easy, low cost manufacture and assembly to provide a unit capable of long, foolproof and trouble-free operation.

The invention has other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

Referring to said drawings:

Figure 1 is a side elevation, partly in section, of main and auxiliary transmissions operatively associated with their shifting mechanisms, including the shifting mechanism of the present invention.

Figure 2 is a side elevation of a portion of the shifting mechanism as indicated by the line 2—2 of Figure 1.

Figure 3 is a side elevation, partly in section, of an alternate mounting for the shifting mechanism of the present invention.

Figure 6 is a cross-sectional view of the shifting mechanism.

Figure 7 is a fragmentary cross-sectional view of the mechanism taken substantially on the plane of line 7—7 of Figure 6.

Figure 8 is a cross-sectional view of the mechanism taken substantially on the plane of line 8—8 of Figure 6.

Figure 9 is a cross-sectional view of the mechanism taken substantially on the plane of line 9—9 of Figure 6.

Figure 10 is a cross-sectional view of the mechanism taken substantially on the plane of line 10—10 of Figure 6.

Figure 11 is a cross-sectional view of the mechanism taken substantially on the plane of line 11—11 of Figure 6.

Figures 4, 5:
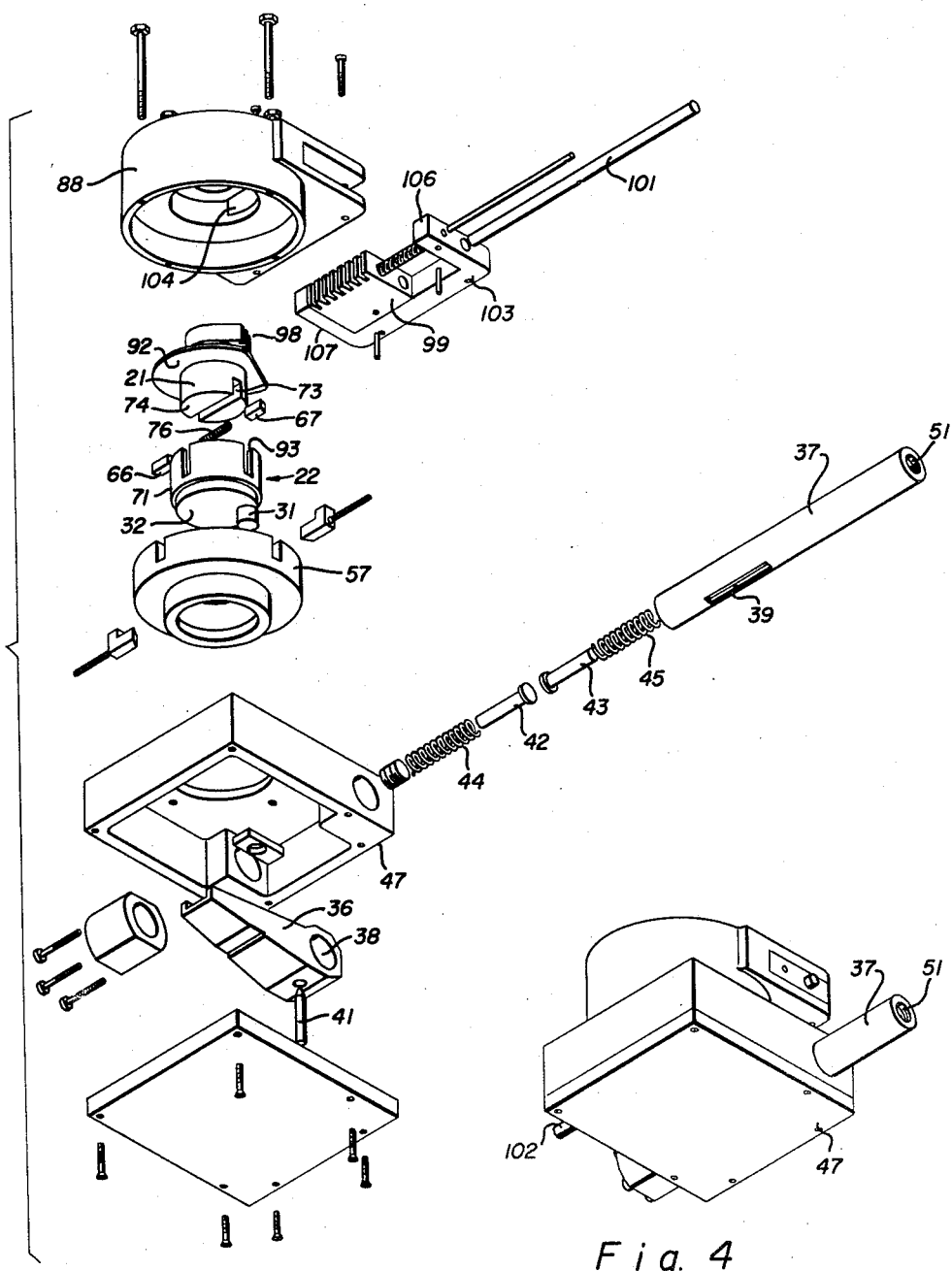
Figure 4 is a perspective view of the shifting mechanism.
Figure 5 is an exploded perspective view of the several parts making up the shifting mechanism.

The shifting mechanism of the present invention, generally denoted by numeral 16, is particularly designed, although not limited, for use with an auxiliary transmission 17 which is coupled to a main transmission 18 in an automotive vehicular drive. Normally, the auxiliary transmission is provided with a reciprocating selector 19 movable between terminal in-gear positions (extreme right and left hand positions, with reference to Figure 1) and an intermediate out-of-gear neutral position. One of the terminal positions may provide an undergear and the other terminal position an overgear (or direct drive) so that each of the driving gear ratios provided by the main transmission 18 may be modified by either an under- or over-drive provided by the auxiliary transmission.

The mechanism 16 includes a reciprocating manually displaceable actuator member 21 having forward and return strokes as best seen in Figure 7; a rotary driven member 22 which is adapted for connection to and for driving the selector 19 and which has four quarter-turn positions 26, 27, 28 and 29 (see Figure 11) corresponding alternately to the terminal and neutral positions of the selector i. e., diametrically opposed positions 26 and 28 representing the two terminal positions of the selector and the other diametrically opposed positions 27 and 29 representing neutral positions of the selector; and latch means connecting the actuator and driven members and effecting a quarter-turn displacement of the driven member upon each forward stroke of the actuator member, the latch means further functioning to lock the driven member in each of its quarter-turn positions during the return stroke of the actuator member.

Coupling of the rotary driven member 22 and the linear reciprocating selector member 19 is here effected by a sliding crosshead means best illustrated in Figures 5 and 11. This means includes a pin 31 mounted in eccentric depending fashion from the end face 32 of the shift member 22 for journaled engagement in an opening provided in a slide block 33 mounted for sliding linear reciprocation in a channel 34 formed in a crosshead member 36 arranged for connection by rod 37 to the selector 19. The connection between the crosshead member 36 and rod 37 may, as here shown, include a resilient centering means to afford cushioning of the movement of the selector. As will be observed from Figures 5, 6 and 11, the crosshead member 36 is formed with a bore 38 for receiving the rod 37 and the latter is formed with an elongated slot 39 for receipt of a pin 41 mounted in the crosshead 36 diametrically through the bore 38 and rod 37. Connection of the pin 41 to the rod 37 is effected by headed pins 42 and 43 mounted within the rod 37 and urged into engagement on opposite sides of the pin by compression springs 44 and 45, the latter functioning to constantly maintain a resilient centralized position of the rod 37 at crosshead member 36.

In the arrangement illustrated in the drawings, except Figure 3, the rod 37 is journaled for sliding reciprocation in a housing section 47 and projects therefrom for connection to a reciprocating rod 48 carrying the selector 19 in the transmission 17. As here shown, the shift mechanism is bolted, or otherwise secured, with the housing section 47 mounted against an end face 49 of the housing for the transmission 17, and one end of rod 48 is threaded into a socket 51 provided in an end of rod 37. An alternate mounting for the shifting mechanism is illustrated in Figure 3, wherein the housing 47 and the crosshead mechanism contained therein is deleted and pin 31 of the rotary driven member is mounted in a crosshead slot provided in the selector member 19a. In such case, the shifting mechanism 16a, modified as described, may be mounted as illustrated on the top wall 52 of the housing for the auxiliary transmission 17. In either case, it will be seen that as the driven member is moved to a quarter-turn position, as represented by position 26 in Figure 11, the selector 19 will be moved to one of its terminal in-gear positions; and as the driven member is rotated a quarter-turn to position 27, the selector 19 will be moved to its intermediate neutral position; and as the driven member is rotated a next quarter-turn to position 28, the selector 19 will be moved to its opposite in-gear terminal position; and as the driven member is rotated a next quarter-turn to position 29, the selector 19 will be again moved to an intermediate neutral position. In this fashion, it will be observed that the selector 19 is displaced to neutral position on every other advance stroke of the shifting mechanism. This makes for an ideal shifting arrangement since the operator is assured of automatically finding a neutral position by effecting a simple advance stroke of the shifting mechanism from either of the terminal in-gear positions.

The latch means above referred to is composed of a first latch mechanism, generally illustrated in Figure 10, connecting the actuator and driven members 21 and 22 and providing a unidirectional drive therebetween advancing the driven member 22 on each forward stroke of the actuator member; a second latch mechanism, generally illustrated in Figure 9, indexing and locking the driven member 22 in each of its quarter-turn positions and defining the terminus of the forward stroke of the actuator, the first latch mechanism, Figure 10, being formed to permit a return stroke of the actuator while the driven member is locked by the second latch means, Figure 9; and means 53 which functions to release the second latch mechanism adjacent to the start of each forward stroke, the second latch mechanism functioning to re-engage and lock the driven member at the end of a quarter-turn thereof. The parts functioning as above described will effect a precise quarter-turn of the driven member on each forward stroke of the actuator member.

As will be observed from Figures 6, 9 and 10, the drive and driven members 21 and 22 are concentrically mounted for relative rotation within a housing section 57. One of the members, here driven member 22, is formed with four equally circumferentially spaced openings 61, 62, 63, and 64, and the other member, here drive member 21, carries one or more spring pressed pawls 66 and 67 engageable in the openings 61–64 to lock members 21 and 22 for joint rotation during the forward stroke of the actuator member.

The driven member 22 is preferably constructed of tubular form having a cylindrical side wall 68 with internal and external peripheral surfaces 69 and 71 concentric to the axis of rotation of the member and which extend from a disc-shaped end wall 72 providing the end face 32 and the support for pin 31. The actuator member 21 is of cylindrical form having an exterior periphery 54 journaled for rotation on the internal surface 69 of the driven member 22. The aforementioned openings 61–64 are preferably formed as axially extending slots running for substantially the full length of the cylindrical wall 68 and completely through the wall so as to connect the internal and external peripheral surfaces 69 and 71. Pawls 66 and 67 are carried in a diametrical cross slot 73 in the end face 74 of the actuator member 21, see Figures 5 and 10, and are urged radially outwardly by a centrally positioned compression spring 76 into engagement with the internal surface 69 of driven member 22. As will be observed from Figure 10, the width of the pawls 66 and 67 is somewhat greater than the width of the slots 61–64 so as to prevent the pawls from fully entering the slots, and the outer ends 77—78 of the pawls are beveled, as seen in Figure 10, so as to interlock on the forward stroke of the actuator while permitting the return stroke of the actuator member when the driven member is locked by the second latch mechanism illustrated in Figure 9.

The second latch mechanism illustrated in Figure 9 is composed of a pair of pawls 81 and 82 which are mounted in diametrically opposed slots 83 and 84 in the housing section 57 for radial reciprocation and are urged radially inwardly by compression springs 86 and 87 mounted in spring receiving openings in the pawls, see Figure 6, and extending outwardly therefrom in slots 83 and 84 and into a compressed supported position against the internal surface of a surrounding housing section 88. Pawls 81 and 82 are thus urged radially inwardly into engagement with the external surface 71 of the driven member so as to snap into engagement with the quarter-turn slots 61–64. Pawls 81 and 82 are also made somewhat wider than the slots 61–64 so as to prevent their complete entry into the slots, and with reference to Figure 9 it will be noted that the inner end 89 of pawl 81 is beveled to lock the counter-clockwise forward stroke of member 22 while permitting its clockwise return stroke, and the inner end 91 of pawl 82 is beveled to lock the clockwise return stroke of member 22 while permitting the counter-clockwise forward stroke. Pawls 81 and 82 thus cooperate to precisely index the quarter-turn positions of the driven member 22 and further solidly lock the driven member in its quarter-turn position thereby positively positioning the auxiliary transmission in a terminal in-gear or intermediate neutral position.

The means 53 for releasing member 22 for quarter-turn rotation by the drive member here consists of a cam plate 92 provided on the actuator member 21 in surrounding relation thereto and adjacent the open end face 93 of the driven member 22. As will be best seen from Figures 5, 6 and 8, the cam plate 92 is of generally circular form set in a circular interior wall 94 provided in housing section 57; and pawl members 81 and 82 are formed with raised shoulder portions 96 and 97 which extend into juxtaposition to the outer face of the cam plate at the face 94. Pawl 82 is dimensioned so as to enter one of the slots 61–64, see Figure 9, and be supported on the exterior surface 71 of the driven member 22 and position its raised shoulder 97 just at the interior wall 94 so that pawl 82 is unaffected in its operation by the sweep of the cam plate. The other pawl 81, however, is dimensioned so that when it is engaged in one of the slots 61–64, as seen in Figure 9, its shoulder portion 96 will extend interiorly of the circular wall 94. Accordingly, the cam plate 92 is provided with a pointed cam 53 which will sweep past shoulder 96 in the forward stroke of the actuator member 21 and, in so doing, will displace pawl 81 outwardly against the resistance of its spring 86 and thus permit rotation of the driven member in a counter-clockwise forward stroke direction. As the cam point 53 passes shoulder 96 it releases the pawl 81 for spring pressed re-engagement against the exterior surface 71 of the driven member so that the pawl 81 defines the terminus of the forward stroke of both the drive and driven members.

The means for manually advancing and retracting the actuator member 21 may take various forms such as a cable or gear and may be energized by any of the well-known electrical or hydraulic means. A rack and pinion means is here shown, see Figures 5, 6 and 7 and includes a segment gear 98 carried by the actuator member 21 and enmeshed with a rack 99 mounted for reciprocation in a bracket 103 mounted in and forming part of housing section 88, see Figures 5 and 6, so as to position the teeth of the rack at a slotted opening 104 in the housing section 88 for registration with the segment gear 98. As will be best seen in Figures 5 and 7, the rack 99 is secured to a transverse reciprocating rod 101 carried by spaced legs 106 and 107 of bracket 103 for extension from the housing 88 so as to position one end 108 exteriorly of the housing for appropriate engagement and actuation, see Figure 1. Normally, the rack 99 is urged by spring 109 to a terminal position abutted against leg 106 which serves to define the start of the forward stroke of the mechanism. Spring 109 is here mounted on a stem 111 extending between the legs 106 and 107 and is supported at one end against the leg 107 and at its other end in a spring receiving opening 112 provided in the rack.

Preferably, the shifting mechanism is adapted to be remotely operated from the main shift lever 113 for the main transmission 18 so that the auxiliary transmission may be shifted simultaneously with shifting of the main transmission, and both transmissions may be shifted by a one-hand control without requiring the driver of the vehicle to remove the other hand from the steering wheel, thus leaving the operator in full control of the vehicle during all shift operations. To accomplish this, it is essential that the shifting mechanism function smoothly and with light manually applied force as may be accomplished conveniently and comfortably by the closing of the hand. Normally, the work of shifting a transmission is greater than that obtainable from mere finger action of the hand. However, by breaking the complete shift movement into two halve movements, i. e., two forward strokes as here provided, the effort of effecting each stroke lies easily and comfortably within the available finger power as obtained on a simple closing of the hand.

In the present construction, a remote cable control is suggested, consisting of a control cable 114 which is connected at one end 116, by bracket 117, to the end 108 of actuating rod 101. The opposite end 118 of the control cable 114 is mounted on the shift lever 113 by brackets 119 and 121, and the end of the control cable is fitted with a cross handle 122 mounted directly under the conventional ball shaped hand knob 123 on the upper end of the lever 113. The operator may place the palm of his hand over ball 123 and drape his fingers in encircling relation around the cross handle 122. Accordingly, by a simple and easily effected gripping action, the operator may raise handle 122 to effect the forward stroke of the shift mechanism at any time during the movement of shift lever 113 or before or after such movement.

A brief statement of operations follows. At the start of the forward stroke of the shift mechanism, the actuator member 21 will be held in its initial position by rack 99 abutted against bracket leg 106 by spring 111, see Figure 7, and shift handle 122 will be in its lowermost position as seen in Figure 2. Grasping and raising of handle 122 will effect a displacement of rack 99 in the direction of bracket leg 107 against the resistance of spring 109 thus effecting a counter-clockwise forward stroke of the actuator member 21. In the present construction, the actuator member is arranged to move through approximately 112° of rotation. During the first 22° of rotation the pawls 66 and 67 of the actuator member 21, see Figure 10, ride against the interior surface 69 of the driven member 22 while the driven member is locked against accompanying rotation by pawl 81, see Figure 9. At the end of this initial 22° of rotation, pawls 66 and 67 snap into slots 61 and 63 thereby interlocking the drive and driven members 21 and 22 for joint forward counter-clockwise rotation. At the same time, cam point 53 engages pawl shoulder 96 displacing pawl 81 out of interlocking engagement in slot 61 and thus permitting forward counter-clockwise rotation of the driven member 22 together with the drive member 21. At the end of the next 90° of forward rotation, pawl 81 again snaps into slot 64 thus locking the driven member 22 against further forward counter-clockwise rotation and defining the terminus of the forward stroke of the actuator member. At the same time, pawl 82 snaps into slot 62 to lock the driven member 22 against return clockwise rotation. This quarter-turn rotation of the driven member is translated by the cross-head means illustrated in Figure 11 into a displacement of the selector 19 from an intermediate neutral position 29, as shown, to a terminal in-gear position 26.

Upon releasing handle 122, the mechanism is permitted to effect its return stroke under the urge of spring 109 which pushes rack 99 back toward bracket leg 106, and, in so doing, effects a return clockwise stroke of the drive member 22. This return rotation of the drive member 22 is permitted by pawls 66 and 67, see Figure 10, while the driven member 22 is locked in its quarter-turn position by pawls 81 and 82. During this return stroke of approximately 112°, cam point 53 again sweeps by pawl shoulder 96. The momentary disengagement of pawl 81 with the driven member 22 does not effect the interlock of the driven member provided by the diametrically opposed pawl 82. Immediately, however, as cam point 53 passes shoulder 96 on the return stroke, pawl 81 re-engages in slot 64. The return stroke continues until the return movement of rack 99 is stopped by bracket leg 106 when the parts are positioned as illustrated in the drawings. It will thus be seen that on successive forward strokes of the actuator member 21, the driven member 22 will be advanced one quarter-turn, and this will have the effect of shifting the auxiliary transmission from neutral to one terminal in-gear position, back to neutral, et. seq. Accordingly, with a simple unidirectional pull on handle 122 the operator is provided a very fast and precise means of shifting the auxiliary transmission from in-gear to neutral positions or vice versa, and particularly is not required to seek out and find the neutral position thereby enabling him to double clutch and shift very rapidly in selecting the proper gear ratio to suit road, grade or load conditions without losing valuable road speed and thus obtaining optimum performance and maximum benefit from the multi-gear ratio afforded.

I claim:
1. A shifting mechanism for a transmission having a reciprocating selector movable between terminal in-gear positions and an intermediate out-of-gear neutral position comprising, a reciprocating manually displaceable actuator member having forward and return strokes, a rotary driven member adapted for connection to and for driving said selector and having four quarter-turn positions corresponding alternately to said terminal and neutral positions of said selector, and latch means connecting said actuator and driven members and effecting a quarter-turn displacement of said driven member upon each forward stroke of said actuator member, said latch means locking said driven member in each of its quarter-turn positions during said return stroke of said actuator member.

2. A shifting mechanism for a transmission having a linear reciprocating selector movable between terminal in-gear positions and an intermediate out-of-gear neutral position comprising, a rotary manually displaceable actuator member having forward and return strokes, a rotary driven member, latch means connecting said actuator and driven members and effecting a quarter-turn displacement of said driven member upon each forward stroke of said actuator member, said latch means locking said driven member in each of its quarter-turn positions during said return stroke of said actuator member, and cross-head means connected to said driven member and adapted for connection to and for driving said selector and converting successive quarter-turn rotary displacements of said driven member into linear reciprocation of said selector to alternately position said selector in its in-gear and neutral positions.

3. A shifting mechanism for a transmission having a reciprocating selector movable between terminal in-gear positions and an intermediate out-of-gear neutral position comprising, a rotary manually displaceable actuator member having forward and return strokes, a rotary driven member adapted for connection to and for driving said selector and having four quarter-turn positions corresponding alternately to said terminal and neutral positions of said selector, first latch means connecting said actuator and driven members and providing a unidirectional drive therebetween advancing said driven member on each forward stroke of said actuator member, second latch means indexing and locking said driven member in each of its said quarter-turn positions and defining the terminus of said forward stroke of said actuator member, said first latch means being formed to permit said return stroke of said actuator member while said driven member is locked by said second latch means, and means releasing said second latch means adjacent the start of each said forward stroke.

4. A shifting mechanism for a transmission having a reciprocating selector movable between terminal in-gear positions and an intermediate out-of-gear neutral position comprising, a rotary manually displaceable actuator member having forward and return strokes, a rotary driven member adapted for connection to and for driving said selector and having four quarter-turn positions corresponding alternately to said terminal and neutral positions of said selector, releasable latch means engaging said driven member at said quarter-turn positions and locking said driven member against rotation and functioning when released to re-engage and lock said driven member following a quarter-turn rotation of said driven member, latch means connecting said actuator and driven members for joint movement during said forward stroke and permitting relative movement of said members during said return stroke, and means releasing said first mentioned latch means at the start of each forward stroke whereby a precise quarter-turn of said driven member will be effected on each forward stroke of said actuator member.

5. A shifting mechanism for a transmission having a reciprocating selector movable between terminal in-gear positions and an intermediate out-of-gear neutral position comprising, a rotary manually displaceable actuator member having forward and return strokes, a concentrically mounted and relatively rotatable driven member adapted for connection to and for driving said selector and having four quarter-turn positions corresponding alternately to said terminal and said neutral positions of said selector, one of said members being formed with four equally circumferentially spaced latch openings, a pawl carried by the other of said members and engageable in said openings to lock said members for joint rotation during said forward stroke, latch means indexing and locking said driven member at the end of each of its said forward strokes, said pawl being formed to permit said return stroke of said actuator member in the locked position of said driven member, the positioning of said pawl and openings permitting an initial rotaton of said actuator member at the start of each forward stroke before interlocking engagement of said pawl and one of said openings, and means actuated by said actuator member during said initial rotation releasing said latch means for precise quarter-turn rotation of said driven member.

6. A shifting mechanism for a transmission having a reciprocating selector movable between terminal in-gear positions and an intermediate out-of-gear neutral position comprising, a housing, a rotary manually displaceable actuator member mounted therein and having forward and return strokes, a driven member mounted for rotation in said housing concentrically of said actuator member and adapted for connection to and for driving said selector and having four quarter-turn positions corresponding alternately to said terminal and said neutral positions of said selector, one of said members being formed with four equally circumferentially spaced latch openings, a pawl carried by the other of said members and engageable in said openings to lock said members for joint rotation during said forward stroke, latch means indexing and locking said driven member at the end of each of its said quarter-turn positions and defining the terminus of said forward stroke, said pawl being formed to permit said return stroke of said actuator member in the locked position of said driven member, the positioning of said pawl and openings permitting an initial rotation of said actuator member at the start of each forward stroke before interlocking engagement of said pawl and one of said openings, and a cam carried by said actuator member and engageable with said latch means during said initial rotation for releasing said latch means for precise quarter-turn rotation of said driven member.

7. A shifting mechanism for a transmission having a reciprocating selector movable between terminal in-gear positions and an intermediate out-of-gear neutral position comprising, a housing, a tubular driven member mounted for rotation in said housing and having a cylindrical wall with internal and external peripheral surfaces concentric to the axis of rotation of said member, said driven member being adapted for connection to and for driving said selector and having four quarter-turn positions corresponding alternately to said terminal and said neutral positions of said selector, a manually displaceable actuator member journaled for rotation within said internal surface and having forward and return rotary oscillating strokes, said driven member being formed with four equally circumferentially spaced axially extending slots through said wall, first and second pawls carried by said housing in diametrically opposed relation to said axis and for radial reciprocation and being spring-pressed to said external surface for interlocking engagement in said slots at each quarter-turn position of said driven member, said first pawl being formed to stop movement of said driven member in a forward direction of rotation corresponding to the direction of said forward stroke while permitting movement of said driven member in a reverse direction of rotation, said second pawl being formed to stop movement of said driven member in said reverse direction of rotation while permitting movement of said driven member in said forward direction, and third and fourth pawls carried by said actuator member in diametrically opposed relation to said axis and for radial reciprocation and being spring-pressed to engage said internal wall and being formed for interlocking engagement in said slots on the forward stroke of said actuator member while permitting said return stroke while said driven member is locked against return movement of said second pawl, and a cam carried by said actuator member and engageable with said first pawl during said forward stroke to displace said first pawl out of its slot-engaged position simultaneously with the engagement of said third and fourth pawls with said slots.

8. A shifting mechanism as characterized in claim 7 and including a gear connected to said actuator member, a rack mounted for reciprocation in said housing and engageable with said gear to provide said forward and return strokes, and stop means engageable with said rack to define the terminus of said return stroke, the engagement of said first pawl in one of said slots defining the terminus of said forward stroke.

References Cited in the file of this patent

UNITED STATES PATENTS

| 2,106,731 | Gallimore | Feb. 1, 1938 |
| 2,126,032 | Randol | Aug. 9, 1938 |
| 2,577,019 | Kestroton | Dec. 4, 1951 |